United States Patent [19]

Mandel et al.

[11] Patent Number: 4,728,838
[45] Date of Patent: Mar. 1, 1988

[54] ASSEMBLY FOR MOUNTING A MOTOR TO AN INSULATED WALL

[76] Inventors: Sheldon W. Mandel, 1703 Bridge Ave.; Chinmoy Banerjee, 1117 Hawkinson Ave. - Apt. 1, both of Galesburg, Ill. 61401

[21] Appl. No.: 927,385

[22] Filed: Nov. 6, 1986

[51] Int. Cl.[4] ............................................. H02K 5/08
[52] U.S. Cl. ......................................... 310/91; 220/83; 310/90; 310/89; 384/317; 384/476; 384/900; 417/373
[58] Field of Search .................. 220/66, 83; 310/43, 310/67 R, 89, 90, 91, 104; 312/214, 236; 417/373; 432/199; 384/317, 320, 277, 476, 900

[56] References Cited

U.S. PATENT DOCUMENTS

| | | | |
|---|---|---|---|
| 1,953,540 | 4/1934 | Odgen | 415/175 |
| 2,173,489 | 9/1939 | Voigt | 384/320 |
| 2,174,854 | 10/1939 | Corwin | 384/476 |
| 2,489,009 | 11/1949 | Corhanidis | . |
| 2,656,973 | 10/1953 | Sutherland | 417/373 |
| 2,694,157 | 11/1954 | Cone | 310/89 |
| 2,714,538 | 7/1955 | Hornbostel | 384/476 |
| 2,982,115 | 5/1961 | Wurtz et al. | . |
| 3,111,817 | 11/1963 | Solley, Jr. | . |
| 3,717,779 | 2/1973 | Hallerback | . |
| 4,219,325 | 8/1980 | Gutzwiller | 417/373 |
| 4,512,724 | 4/1985 | Horvath | 310/89 |
| 4,534,686 | 7/1985 | Nakamura et al. | 310/90 |

*Primary Examiner*—Patrick R. Salce
*Assistant Examiner*—D. L. Rebsch
*Attorney, Agent, or Firm*—Bacon & Thomas

[57] ABSTRACT

A device for mounting a motor to the wall of a refrigerator whereby the motor is supported on the exterior side of the wall and is provided with a long output shaft which extends through the wall and is supported in a bearing assembly carried by a thermal barrier which maintains stable rotation of the shaft and prevents motor heat from flowing to the bearing assembly.

6 Claims, 2 Drawing Figures

ASSEMBLY FOR MOUNTING A MOTOR TO AN INSULATED WALL

BACKGROUND OF THE INVENTION

1. Field of the Invention

The present invention generally involves the field of technology pertaining to devices for mounting an electric motor to an appliance. More particularly, the invention relates to a device for mounting an electric motor to a wall of an appliance wherein the wall separates two different temperature zones.

2. Description of the Prior Art

A refrigerated compartment, such as found in a domestic refrigerator or freezer, is normally provided with a fan blade or impeller for the purpose of circulating cold air derived from the evaporator of the refrigeration system. The compartment is typically formed from walls of insulated material and provided with an access opening that is closed by a hinged door. The fan blade is disposed within a ducting which provides communication between the evaporator and the compartment. In some conventional installations, an electric motor is secured to the exterior of an insulated wall of the compartment. The output shaft of the motor is disposed through a hole in the wall and into the ducting for attachment to the fan blade.

This known configuration for mounting an electric motor and an associated fan blade has been proven disadvantageous for several reasons. The disposition of the motor on the exterior side of the compartment wall necessarily requires the utilization of a long power output shaft for supporting the fan blade. Because of the extended length of the output shaft, its rotation is generally unstable, particularly towards the end of the shaft on which the fan blade is mounted. In this arrangement, the bearing assembly for the output shaft is required to be disposed adjacent the motor, thereby subjecting the bearing assembly to possible detrimental effects caused by heat generated during operation of the motor. Moreover, the hole in the compartment wall through which the output shaft extends also requires a rotating seal, in order to prevent heat from entering the compartment and imposing a greater load on the refrigeration system.

SUMMARY OF THE INVENTION

It is an object of the present invention to provide a device for mounting an electric motor and an associated fan blade to a wall separating two different temperature zones.

It is an other object of the invention to provide a device for effectively isolating the heat generated during operation of an electric motor from the interior of a refrigerated compartment.

It is a further object of the invention to provide a device for attaching an electric motor and an associated fan blade to the insulated wall of a refrigerated compartment whereby the motor may utilize an extended output shaft which is maintained in stable rotation about its longitudinal axis.

It is yet another object of the invention to provide a device for supporting an extended output shaft of an electric motor through the insulated wall of a refrigerated compartment whereby the bearing assembly for the output shaft is protected from the heat generated during operation of the motor.

These and other objects of the invention are realized through a device which comprises a thermal barrier in the form of an elongate member provided with an axial passageway extending longitudinally therethrough and a flanged mounting plate at one end of the member. A motor housing is secured to the mounting plate for enclosing an electric motor. A first bearing assembly is provided in the passageway adjacent the other end of the elongate member, and a second bearing assembly is supported in a cup carried by the motor housing. An electric motor disposed within the housing is provided with a long output shaft which extends completely through the elongate member, whereby the end of the shaft is rotatably supported by the first bearing assembly for mounting a fan blade thereon. The other end of the output shaft is rotatably supported by the second bearing assembly, and preferably extends outwardly thereof for rotating a second fan blade. The thermal barrier is preferably integrally formed of rigid material having sufficient physical integrity so as not to deform with time or when subjected to wide temperature conditions, and is of low thermal conductivity.

Other objects, features and advantages of the invention shall become apparent from the following detailed description of a preferred embodiment thereof, when considered in conjunction with the accompanying drawings wherein like reference characters refer to corresponding parts in the different views.

DETAILED DESCRIPTION OF THE PREFERRED EMBODIMENT

Figure 1:
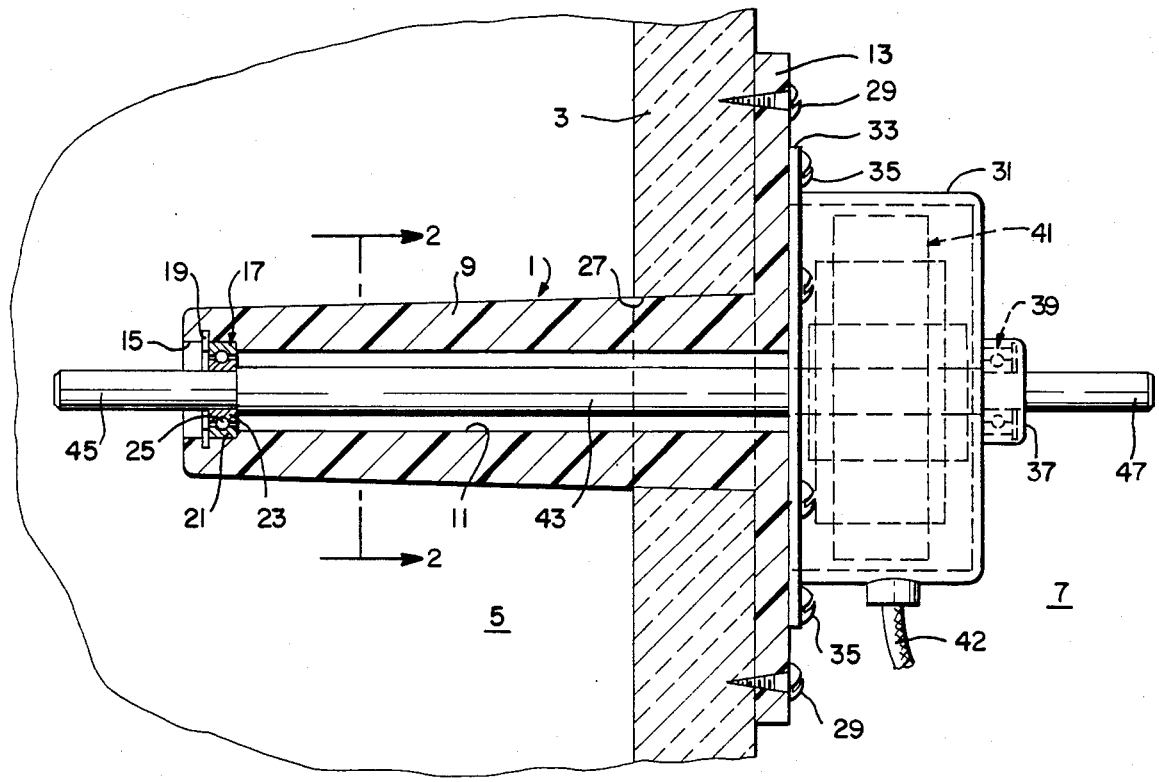
FIG. 1 is a partial sectional elevational view of a device according to a preferred embodiment of the invention shown mounting a motor and an associated long output shaft to an insulated wall of a refrigerated compartment.

A device 1 according to a preferred embodiment of the invention shall now be described with initial reference to FIGS. 1 and 2. As shown therein, device 1 is mounted to a wall 3 which separates a first temperature zone 5 from a second different temperature zone 7. Wall 3 may be of insulated construction for defining, in part, an interior refrigerated compartment containing zone 5 which is maintained at an appropriate low temperature. Accordingly, zone 7 may comprise ambient atmosphere surrounding the exterior of the refrigerated compartment containing zone 5.

Device 1 includes an elongate member 9 provided with an axial passageway 11 extending longitudinally and completely therethrough. One end of member 9 is provided with a flanged mounting plate 13, while the other end of member 9 is formed with a counterbore 15 for receiving a first bearing assembly 17 which is secured in position by means of a spring retaining ring 19 or similar means. Bearing assembly 17 is preferably of the type including an outer circular race 21 and an inner circular race 23 between which a plurality of ball bearings 25 are supported. Bearing assembly 17 may also be of any other structural configuration capable of rotatably supporting a cylindrical shaft and deemed appropriate for the practice of the invention as disclosed herein.

As further seen, elongate member 9 is inserted through a hole 27 formed in wall 3 so as to dispose mounting plate 13 against the exterior surface of wall 3.

Hole 27 is sized so as to provide a snug engagement of member 9 therethrough. Plate 13 is secured to wall 3 by a plurality of screws 29 or similar mechanical fasteners. It is preferred that elongate member 9 and passageway 11 both be of cylindrical configuration and mounting plate 13 be of circular configuration. A motor housing 31 provided with a flanged rim 33 is secured to the exterior of mounting plate 13 by a plurality of screws 35 or similar mechanical fasteners passing through apertures spaced around rim 33. It is preferred that housing 31 be of cylindrical configuration and rim 33 be of circular configuration. Housing 31 is also provided with a bearing cup 37 within which a second bearing assembly 39 is supported. Assembly 39 is preferably of the same structural configuration as that of first bearing assembly 17.

An electrical motor 41 of a conventional type is shown disposed within housing 31 and provided with a cord 42 for receiving electric power from an appropriate source. Motor 41 includes a first output shaft 43 which extends through passageway 11 and is rotatably supported through first bearing assembly 17. Shaft 43 terminates in an end 45 which extends beyond elongate member 9 and on which a fan blade (not shown) may be mounted and driven by the rotation of shaft 43. Passageway 11 should be of minimum diameter for according free rotation of shaft 43. Motor 41 also includes a second output shaft 47 which is preferably coaxial and integral with first output shaft 43. Shaft 47 is supported in second bearing assembly 39 and extends outwardly of bearing cup 37.

Figure 2:
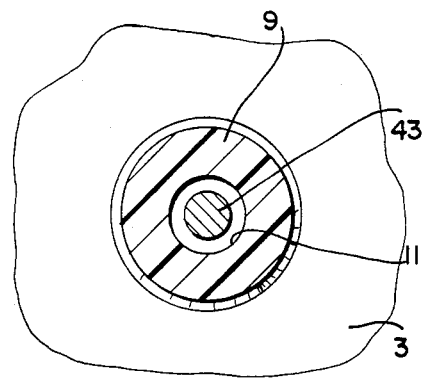
FIG. 2 is a cross-sectional view taken along the line 2—2 of FIG. 1.

As apparent from FIG. 1, first output shaft 43 may be of substantial length, but its axis of rotation is always maintained coaxial with its longitudinal axis because shaft 43 is supported by first bearing assembly 17 disposed adjacent end 45 of shaft 43. This arrangement assures stable rotation of shaft 43 at all times, notwithstanding its overall length.

As shown in FIG. 1, and assuming zone 5 defines the interior of a refrigerated compartment such as a domestic refrigerator or freezer, a fan blade mounted on end 45 of first output shaft 43 may serve the purpose of drawing air across the coils of an evaporator and circulating the cold air through the compartment. Simultaneously, second output shaft 47 may be used to rotate a second fan blade for blowing air across the condenser coils of the same refrigeration system. In this way, a single motor 41 of minimum torque may be utilized to simultaneously rotate two fan blades for more efficiently performing two different functions in the same refrigeration system. This results in economy of operation when compared to conventional systems utilizing two separate motors for rotating separate fan blades.

As also shown from FIG. 1, another important feature of device 1 resides in motor 41 being maintained within exterior zone 7 and therefore effectively isolated from interior zone 5. Thus, when device 1 is utilized in a refrigeration environment as previously discussed herein, the heat given off by motor 41 during its operation is prevented from flowing into zone 5. This serves to minimize the heat load which the existing refrigeration system must remove in order to maintain zone 5 at its desired temperature. In order to realize this advantage, elongate member 9 and its associated mounting plate 13 collectively define a thermal barrier which prevents heat transfer from motor 41 to both first bearing assembly 17 and zone 5. This is accomplished by forming at least elongate member 9, but preferably both elongate member 9 and its associated mounting plate 13, from a material having low thermal conductivity that is capable of withstanding a temperature range of at least −20° F. to 250° F. without deforming physically. The material should also be rigid and have sufficient physical integrity for long term use. Some examples of preferred materials include thermoplastics, such as Noryl TM from the General Electric Company, thermosetting plastics, such as Bakelite, and glass-filled polycarbonate materials. Any other material deemed suitable for the practice of the invention as disclosed herein may also be utilized.

Device 1 serves the dual purpose of effectively isolating heat generated by the operation of motor 41 contained within zone 7 from entering into an adjacent zone 5 and permitting the use of an extended length first output shaft 43 which is also centered and maintained under stable rotation by virtue of its disposition within elongate member 9 and its support in first bearing assembley 17. Accordingly, output shaft power from a motor may be brought through a wall in a "shaft-sealed" manner through the use of device 1 so that heat generated by the motor can remain isolated to one side of the wall. The invention is particularly effective when utilized in conjunction with high performance domestic refrigerators wherein minimization of energy consumption is an important consideration. It is also important to note that the manner in which motor 41 is mounted to device 1 eliminates the requirement for rotating seals and also eliminates the problems associated with heavily cantilevered rotating output shafts such as found in conventional motor mount configurations.

It is to be understood that the embodiment of the invention herein shown and described is to be taken as a preferred example of the same, and that various changes in shape, size and arrangement of parts may be resorted to without departing from the spirit of the invention or scope of the subjoined claims.

We claim:

1. A motor mount assembly for attachment to a wall separating first and second zones and provided with a hole therethrough, which assembly comprises:
   (a) an elongate member having a first end insertable through the hole in the wall for disposition within the first zone;
   (b) attachment means carried by a second end of the elongate member for securing the member to the side of the wall facing the second zone;
   (c) an axial passageway extending longitudinally through the elongate member;
   (d) a motor mounted to the attachment means, the motor including first and second output shafts, the output shafts extending from opposite sides of the motor for rotation about a common axis of rotation;
   (e) a first bearing assembly disposed withint he axial passageway and secured to the elongate member adjacent the first end thereof for rotatably supporting the first output shaft;
   (f) a second bearing assembly carried by the attachment means for rotatably supporting the second output shaft;
   (g) the motor being disposed between the first and second bearing assemblies; and
   (h) the length of the elongate member being such that its first end terminates short of the end of the first output shaft for permitting attachment of a fan blade to the end of the first output shaft.

2. The assembly of claim 1 wherein the elongate member is formed of a material having low thermal conductivity.

3. The assembly of claim 1 wherein the attachment means includes a flanged mounting plate, and the elongate member and flanged mounting plate are integrally formed of plastic material.

4. The assembly of clim 3 wherein the plastic material includes a member selected from the group consisting of a thermol plastic, a thermal setting plastic, a glass-filled polycarbonate plastic and mixtures thereof.

5. The assembly of claim 1 wherein the elongate member and the axial passageway are each of a cylindrical configuration.

6. The assembly of claim 1 wherein the attachment means includes a housing for securing the motor thereto and a bearing cup, with the second bearing assembly being disposed within the bearing cup.

* * * * *